United States Patent [19]

Kim

[11] Patent Number: 4,971,354
[45] Date of Patent: Nov. 20, 1990

[54] COMPACT VEHICLE AIR BAG APPARATUS

[76] Inventor: Kiil Kim, 25514 January Dr., Torrance, Calif. 90505

[21] Appl. No.: 323,940

[22] Filed: Mar. 15, 1989

[51] Int. Cl.$^5$ .............................................. B60R 21/18
[52] U.S. Cl. .................................................... 280/733
[58] Field of Search .................. 180/90; 280/730, 742, 280/743, 733, 735, 803

[56] References Cited

U.S. PATENT DOCUMENTS

| | | | |
|---|---|---|---|
| 3,706,462 | 12/1972 | Lilly | 280/733 |
| 3,801,156 | 4/1974 | Granig | 280/733 |
| 3,841,654 | 10/1974 | Lewis | 280/733 |
| 3,929,348 | 12/1975 | Lawhill | 280/733 |
| 3,933,370 | 1/1976 | Abe et al. | 280/733 |
| 4,348,037 | 9/1982 | Law et al. | 280/733 |
| 4,381,829 | 5/1983 | Mantaron | 280/733 |

Primary Examiner—Richard A. Bertsch
Attorney, Agent, or Firm—Irving Keschner

[57] ABSTRACT

A compact air bag apparatus which comprises an inflatable air bag secured to the vehicle shoulder belt. The depolyment of the air bag is controlled, in the automatic mode of operation, by electronic sensors mounted to the vehicle, the sensors being operative only when the vehicle exceeds a predetermined speed. In the manual mode of operation, excessive movement of the shoulder belt, typically caused by a collision, causes the air bag to deploy regardless of vehicle speed. The air bag, once deployed, is designed to stay inflated, allow the driver to see and continue to control the vehicle after the collision, and to protect the driver from collision impact occurring both from the front of the vehicle and the left side thereof.

10 Claims, 7 Drawing Sheets

COMPACT VEHICLE AIR BAG APPARATUS

BACKGROUND OF THE INVENTION

1. Field of the Invention

The present invention relates to a vehicle air bag system, and in particular, to an air bag restraining system which is mounted to the vehicle shoulder belt, the deployment of the air bag being automatically triggered prior to a collision by sensor means. A manual mode of deployment is also provided.

2. Description of the Prior Art

Belt restraints, both of the lap and shoulder variety, have been installed in vehicles for many years in order to reduce deaths and serious injuries resulting from collisions. Recently, air bag restraints have been installed in vehicles to provide an additional technique for reducing injuries suffered as a result of collisions.

In a typical air bag restraint system, the air bag and the devices necessary to inflate the air bag are installed, for example, in a recess in the vehicle dashboard. When a collision is detected, the air bag is automatically inflated. Typical of the prior art air bag systems are those disclosed in U.S. Pat. No. 3,883,154 to McCullough, Jr. et al which disclose techniques for using ambient air to assist in deploying the crash restraint bag; U.S. Pat. No. 4,449,728 to Pilatzki which discloses a reinflatable air bag which is automatically inflated when the deceleration of the vehicle is greater than a predetermined amount, the inflated air bag being designed to allow the driver to see after inflation; U.S. Pat. No. 3,831,992 to Allgaier et al which discloses an inflatable gas cushion which is shaped to minimize neck injuries to a user, and U.S. Pat. No. 4,298,214 to Brown which discloses a roof mounted air bag which is inflated by an electrical signal generated by an impact sensing device or emergency hand switch.

Although the air bag restraint systems currently available have been designed to provide enhanced features as evidenced by the aforementioned patents, there still are serious drawbacks associated therewith. In particular, the automatic sensors currently utilized respond to impacts, i.e., collisions, and are not designed to inflate the air bag prior to impact. Further, a short time period after deployment, most air bags tend to deflate notwithstanding the real possibility that additional collisions may occur after the initial collision. In addition, air bag systems are designed primarily to protect the front portion of a user's body while ignoring the possibility of injury from a side impact. Finally, the air bag, after deployment, typically can not be reused without an expensive retrofit. In the case of older cars not having an air bag system originally installed, it is prohibitively expensive to install an air bag restraint system.

Although the use of belt restraints by the vehicle occupants have increased recently in view of statistical evidence that serious injuries and death have been prevented when they are used, shoulder belts after extended use tend to become loose, reducing their effectiveness as a safety device.

Loose belts increase the risk that serious injuries will occur if the vehicle is involved in a collision. Although belt users may be aware that a collision is imminent, they are unlikely to react in time to prepare for the collision and/or attempt to manually tighten the shoulder belt.

What is therefore desired is to provide an air bag and shoulder belt restraint system which overcomes the disadvantages of current systems as noted hereinabove.

SUMMARY OF THE PRESENT INVENTION

The present invention provides an improved air bag apparatus which enables the air bag to automatically deploy in response to electronic sensors mounted on the vehicle. The air bag is compact and mounted on the vehicle shoulder belt restraint and is also designed to deploy, in the manual mode of operation, upon sudden movement of the user's shoulder belt caused by an impact. The air bag is designed so that when it is deployed it does not inhibit the user from continuing to drive the vehicle after a collision. The air bag remains inflated for a predetermined time period after deployment; once deflated, the air bag can be reused again. The fact that the air bag system is compact in size and mounted to the shoulder belt allows the system to be retrofitted in vehicles not originally equipped with an air bag restraint system.

The electronic sensors are coupled to a control circuit, the output of the control circuit being in turn coupled to a motor. If a collision condition (before or at impact) is detected by one or more of the sensors, at least one signal is generated which is coupled to the motor, the motor shaft rotating in a manner to cause the shoulder belt to tighten against the user's chest and concurrently causes the air bag to inflate. Within a few seconds after the initial signal is received, the motor is disengaged and the shoulder belt returns to its initial position.

The present invention thus provides an improved air bag apparatus which is more effective in terms of safety than is currently available and is capable of being installed in vehicles not designed with an air bag system at a relatively inexpensive cost. In addition, the present invention provides vehicle restraining apparatus which compensates for faulty shoulder belts thus minimizing potential injuries to vehicle occupants. If the automatic air bag deployment system is inoperative (either because of an electrical system failure or because the vehicle is struck in a manner not to energize the air bag detection system), the manual deployment system still would be operative to inflate the air bag, thus providing an effective safety back-up system. The manual system can be installed with the automatic deployment system or as a separate, independent system.

BRIEF DESCRIPTION OF THE DRAWING

For a better understanding of the invention as well as other objects and further features thereof, reference is made to the following description which is to be read in conjunction with the accompanying drawing wherein.

DETAILED DESCRIPTION OF THE INVENTION

Figure 1:
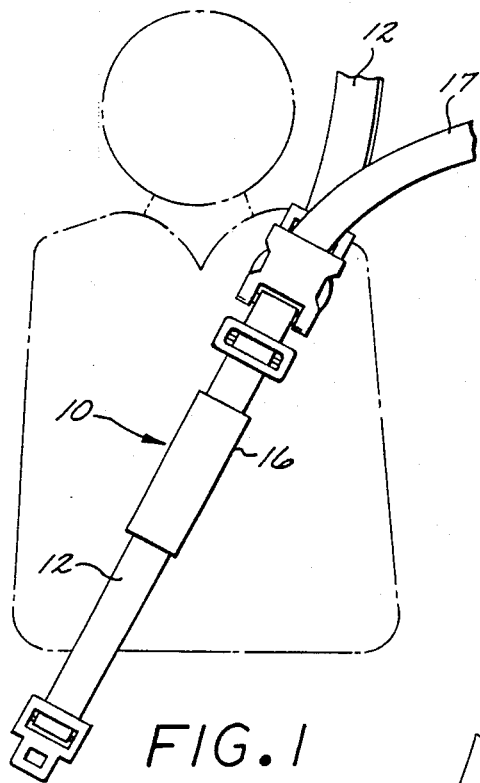
FIG. 1 is a schematic view showing the air bag of the present invention mounted to a shoulder seat belt.

Referring now to FIG. 1, the compact air bag apparatus 10 utilized in the present invention is shown mounted to shoulder seat belt 12. Shoulder belts (and lap belts) are standard safety features found in nearly all vehicles on the road today. Standard shoulder belt 12 restrains a vehicle occupant (illustrated in phantom) against the back portion of the seat (not shown) occupied by the shoulder belt user and in accordance with one aspect of the present invention, is coupled to a motor tensioning device as will be explained hereinafter in more detail with reference to FIGS. 7-9. An air bag 14 (FIG. 3) is secured within housing 16 mounted to shoulder belt 12 and is inflated either automatically in response to signals generated by electronic collision condition sensors or manually upon detection of certain significant movements of optional shoulder belt 17 caused by the user's body, such as when the vehicle rapidly decelerates at the instant of collision.

Figure 2:
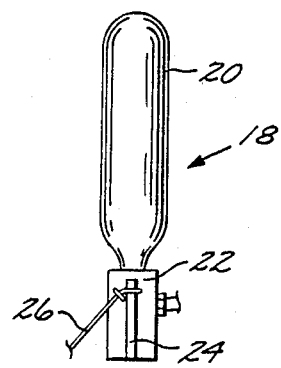
FIG. 2 illustrates the inflator device portion of the air bag system.

FIG. 2 illustrates in more detail the automatic air bag inflator device 18. Device 18 comprises cartridge 20 which stores gas thereon, typically nitrogen gas or carbon dioxide gas. Device 18 further incorporates gas dispensing mechanism 22, lever 24 and lanyard 26. An inflator device which can be used is Model No. ICB 004, manufactured by Stearns Manufacturing Company, St. Cloud, Minnesota. In the manual mode of operation gas is released to inflate air bag 14 when shoulder belt 17 has a large, sudden force applied thereto resulting, for example, from the rapid deceleration of the vehicle caused by a collision, the air bag when inflating extending from housing 16 in a conventional manner. The mounting of cartridge 20 to shoulder belt 17 is arranged such that the lanyard 26 is pulled by the collision force, actuating lever 24 and causing the gas to enter into air bag 14 and to deploy in the manner shown in FIG. 3 (it should be noted that more than one cartridge can be used, depending on the size of the air bag).

Figure 3:
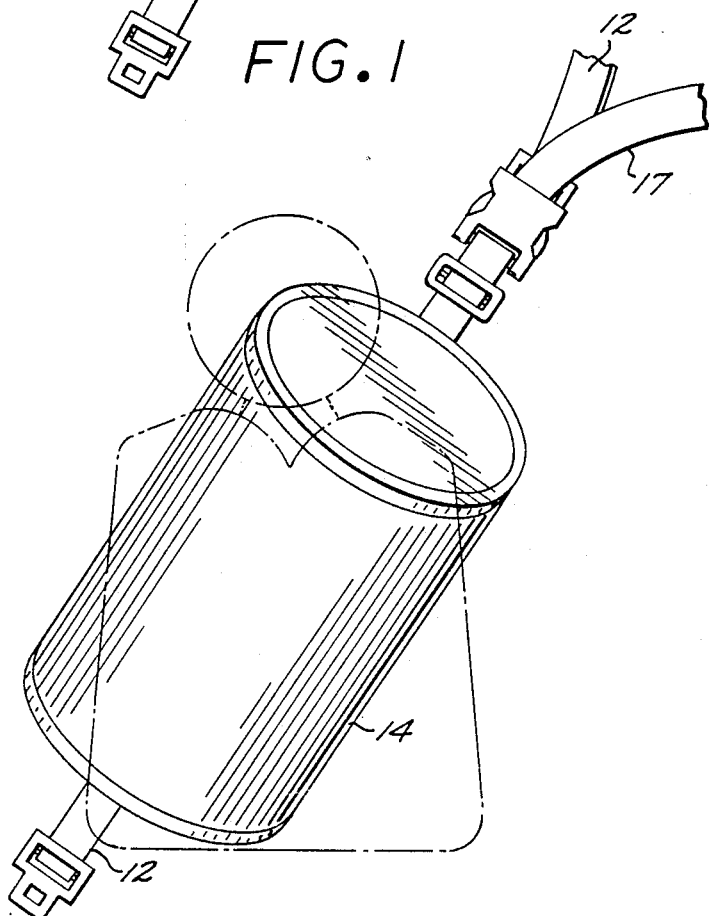
FIG. 3 illustrates the air bag after deployment.

FIG. 3 illustrates, in schematic form, the position and shape of air bag 14 after its deployment. In particular, air bag 14, once inflated, has an essentially cylindrical shape and is designed not to fully cover the face of the driver, thus allowing the driver to continue to control the vehicle even after the air bag is inflated. Air bag 14 is designed to extend past the face of the user to provide some degree of protection to the left side of the driver's face or the right side of a passenger's face from the effects of secondary collisions.

Figure 4:
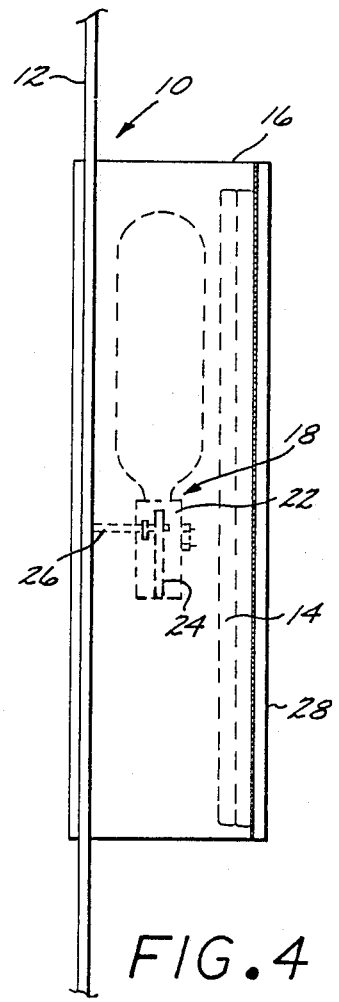
FIG. 4 is a side view of the air bag system mounted to a shoulder belt, the internal components thereof being shown in phantom before deployment.

FIG. 4 illustrates, in a simplified manner, air bag system 10 prior to deployment (inflation) of air bag 14. Housing 16 is mounted directly to shoulder belt 12 and encloses inflator device 18. Air bag 14 is inflated and expands, forcing cover 28 open when either of two conditions occur: the first (automatic mode), when an electrical signal is generated when a collision condition is detected by the vehicle mounted electrical sensors on lead 70 (FIG. 6); the second (manual mode), when lever 24 is actuated by the exaggerated movement of shoulder belt 17 caused by sudden deceleration of the vehicle.

Figure 5:
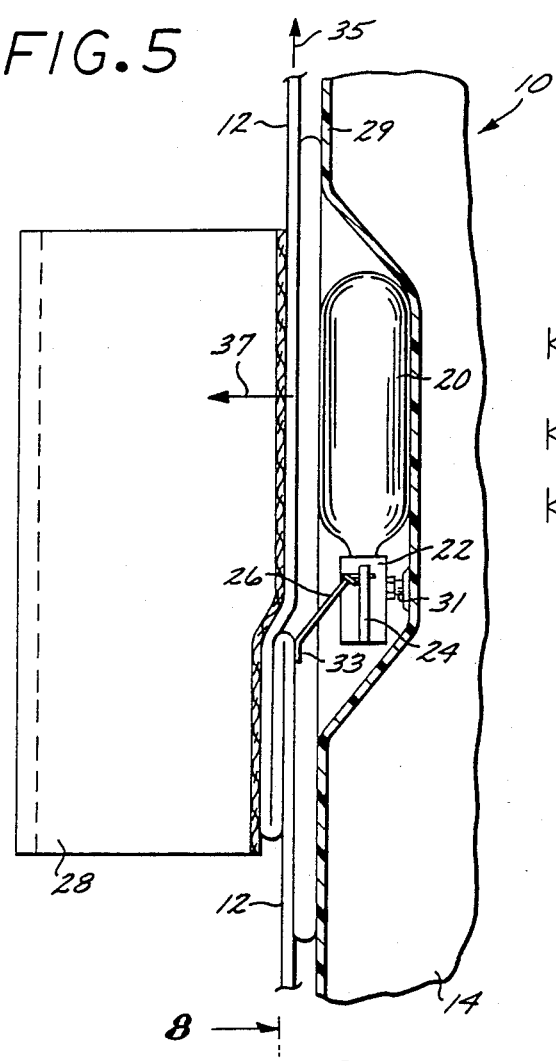
FIG. 5 is a side view illustrating the air bag system after deployment.

FIG. 5 illustrates the air bag system 10 of FIG. 4 in more detail with the cover 28 open. The bottom portion of air bag 14 comprises a rigid mount 29, cartridge 20 being positioned adjacent mount 29 as illustrated. An outlet port 31 in dispensing mechanism 22 enables the gas to be released from cartridge 20 to enter into and inflate air bag 14. A portion of the shoulder belt 12 within housing 16 is folded in an S-shaped loop as illustrated. The end portion 33 of lanyard 26 is attached to shoulder belt 12 at the S-shaped loop portion such that lanyard 26 is pulled a sufficient distance to actuate lever 24 (and thus cause gas in cartridge 20 to be dispensed to air bag 14) in either of two modes of operation: in the first, or automatic mode, shoulder belt 12 is rapidly pulled in the direction of arrow 35 such that the continued movement of shoulder belt 12 first eliminates the loop, pulling lanyard 26 and actuating lever 24; in the second, or manual (semi automatic mode), a collision-caused movement of the user's body (and thus shoulder belt 12) a predetermined distance in the direction of arrow 37 will also pull lanyard 26 and thus actuate lever 24.

Figure 6:
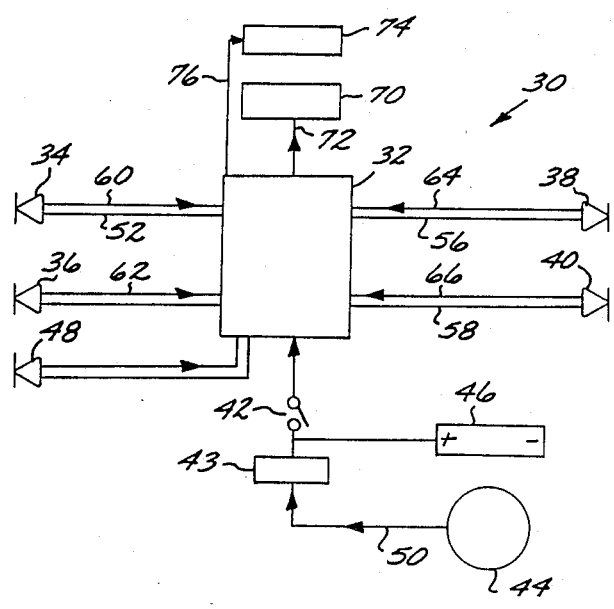
FIG. 6 is an electrical block diagram of the control system of the present invention.

Referring now to FIG. 6, a block diagram of the control apparatus 30 of the present invention is illustrated.

Apparatus 30 comprises control circuit 32, electronic sensors, or detectors, 34 and 36 mounted on the front of the vehicle and electronic sensors 38 and 40 mounted on the rear of the vehicle, switch 42, switch control 43, speed comparison switch 44, battery 46, and an optional voice sensor 48.

Speed comparison switch 44 controls the opening and closing of switch 42 via switch control 43 by generating an electrical signal on lead 50 when the vehicle exceeds a pre-selected speed, typically 50 miles per hour. The presence of a signal on lead 50 causes switch 42 to close, enabling battery 46 (or the output from the cigarette lighter outlet) to energize a conventional control circuit 32. The control circuit 32 in turn energizes the electronic sensors 34, 36, 38 and 40 on leads 52, 54, 56 and 58, respectively. If any of the electronic sensors detect an object within a predetermined distance from the vehicle (i.e., 10 feet) or any other collision condition, such as an actual collision, the return electrical signal on leads 60 (sensor 34), 62 (sensor 36), 64 (sensor 38) and/or 66 (sensor 40) is coupled to shoulder belt rewind motor 70 (FIG. 8) via control circuit 32 and lead 72, causing shoulder belt 12 to be retracted (tightened) rapidly with sufficient force to actuate lever 24 and cause gas from cartridge 20 to flow into air bag 14. Voice sensor 48 may be provided and causes air bag 14 to inflate when a vehicle occupant speaks a predetermined message. An optional alarm speaker 74 can be provided to warn the vehicle occupants that a collision is imminent via a signal on lead 76. If the speed of the vehicle is below the pre-set amount, the electrically controlled, automatic vehicle restraint apparatus portions of the present invention are inoperative.

Figure 7:
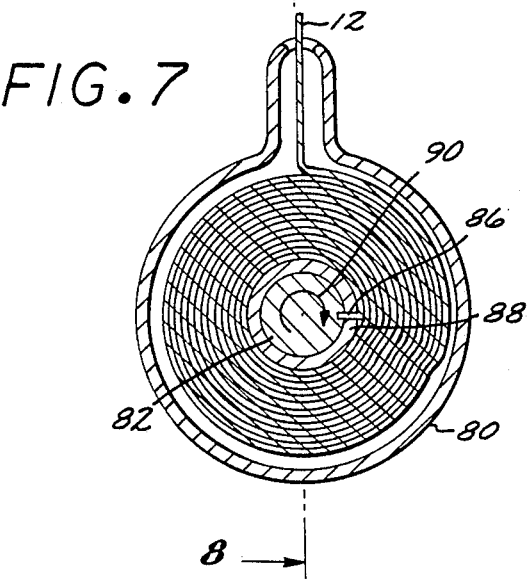
FIG. 7 is a cross-sectional view of the motor driven shoulder belt.
Figure 8:
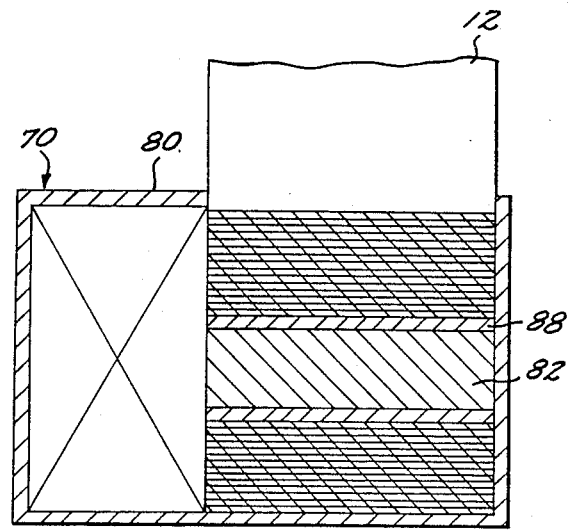
FIG. 8 is a cross-sectional view along line 8—8 of FIG. 7.

Referring now to FIGS. 7 and 8, cross-sectional views of a motor driver shoulder belt restraint in accordance with the optional feature of the present invention is illustrated. D.C. motor 70 comprises a housing 80 and shaft 82. The standard shoulder belt retractor device is modified to the extent that the motor shaft 82 is coupled by pin 86 to the retractor collar 88 whereby rotation of shaft 82 in the clockwise direction (illustrated by reference arrow 90) causes shoulder belt 12 to be wound within retractor housing 80, thus tightening the shoulder belt and forcing the user's upper body against the back of the vehicle seat. At the same time, lever 24 is actuated to enable air bag 14 to be deployed. A timer within control circuit 32 (not shown) reverses the signal to motor 70 after a predetermined time period (i.e., thirty seconds), restoring the shoulder belt to its initial position. It should be noted that if motor 70 becomes inoperative, reel device 100 (FIG. 10) still operates in the conventional manner.

Figure 9:
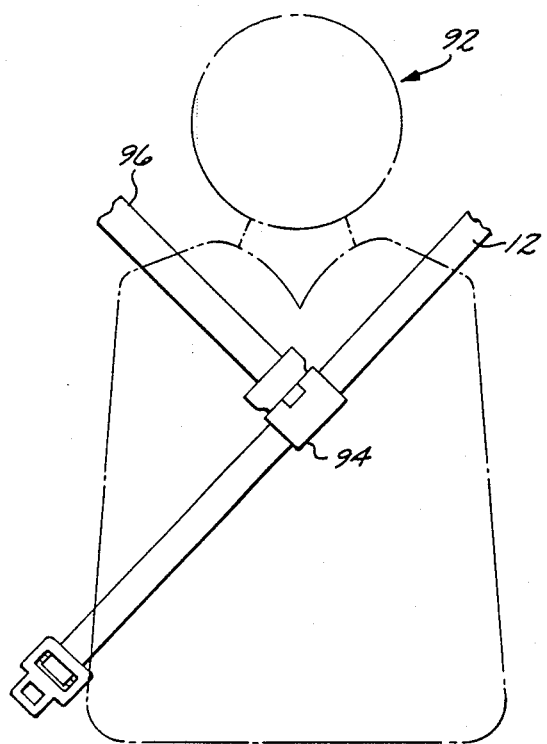
FIG. 9 is a schematic view showing a belt restraining apparatus secured to a vehicle occupant.

FIG. 9 is a simplified schematic showing shoulder belt 12 in position on vehicle occupant 92. A belt restraint connector 94 and an optional second shoulder belt 96 is also provided, shoulder belts 12 and 96 forming a Y-type restraint to provide a greater safety feature in case of a collision.

Figure 10:
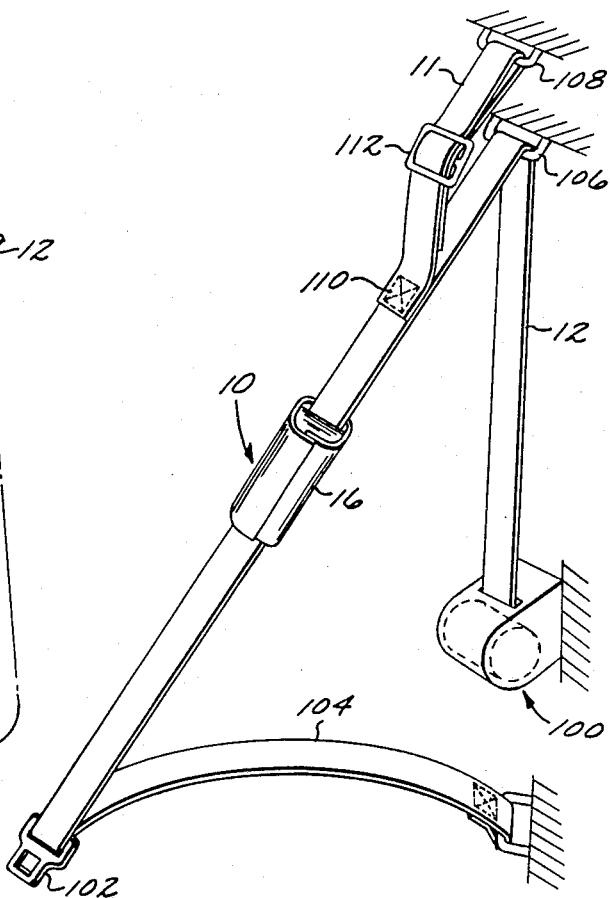
FIG. 10 shows a simplified perspective view illustrating a vehicle shoulder belt modified in accordance with the teachings of a first embodiment of the present invention.

FIG. 10 is a simplified perspective view illustrating how the shoulder belts and air bag apparatus 10 are connected in accordance with the teachings of the present invention. In particular, apparatus 10 is mounted to shoulder belt 12 in a manner such that shoulder belt 12 is movable therethrough. One end of shoulder belt 12 is coupled to reel device 100 and the other end to connector buckle 102. Standard reel device 100 is modified to incorporate motor 70 in order to provide the automatic mode of operation. A lap belt 104 has one end coupled to buckle 102 in a conventional manner. Shoulder belt 12 passes through a bracket 106 secured to the interior of the vehicle as illustrated.

The manual, or semi-automatic, mode of operation is provided by shoulder belt attachment 17 which has one end secured to bracket 108 mounted to the interior wall of the vehicle above bracket 106. The other end of attachment 17 is secured by stitching 110, for example, to shoulder belt 12. Enough slack is provided (illustrated by the bow) in attachment 17 (amount of bow is varied by adjustment buckle 112) to actuate lever 12 when a predetermined amount of collision-caused movement in the direction of arrow 37 (FIG. 5) occurs.

Figure 11:
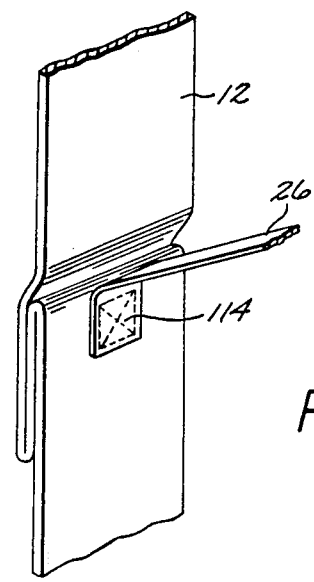
FIG. 11 is a detail showing how the inflator lanyard is coupled to the shoulder belt of a vehicle incorporating the teachings of the present invention.

FIG. 11 is a detail illustrating how the end of lanyard 26, in the form of a thin fabric strip, is stitched (represented by numeral 114) to the folded portion of shoulder belt 12 to provide the features of the present invention. The arrangement shown in FIG. 11 is particularly adapted for use in newly manufactured vehicles and also can be adapted for use in existing vehicles.

Figure 12:
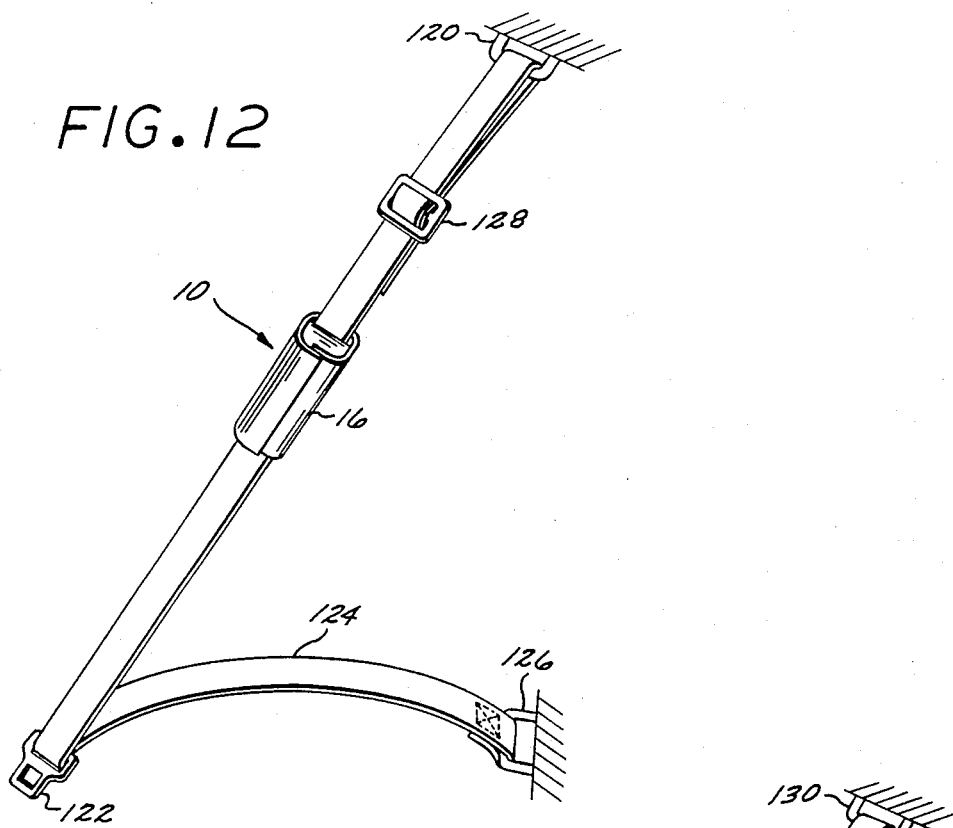
FIG. 12 shows a simplified perspective view illustrating a vehicle shoulder belt modified in accordance with a second embodiment of the present invention.

FIG. 12 illustrates a vehicle shoulder belt modified to use the manual mode of air bag deployment independent of the automatic mode. Apparatus 10 is mounted to shoulder belt 12 in the same manner discussed hereinabove. One end of shoulder belt 12 passes through a bracket 120 secured to the interior of the vehicle as illustrated, the other end being coupled to connector buckle 122. A lap belt 124 has one end coupled to buckle 122 in a conventional manner, the other end being coupled to the interior of the vehicle to bracket 126. An adjustment buckle 128 is provided to enable the user to be properly secured to the vehicle seat.

The air bag system 10 operates to deploy the air bag therein in the manner described hereinabove (manual, or semi-automatic mode) regardless of vehicle speed, the deployment being dependent on the force exerted in the direction of arrow 37 (FIG. 5). The force could be generated by a collision, by the vehicle operator suddenly applying the brakes, etc.

Figure 13:
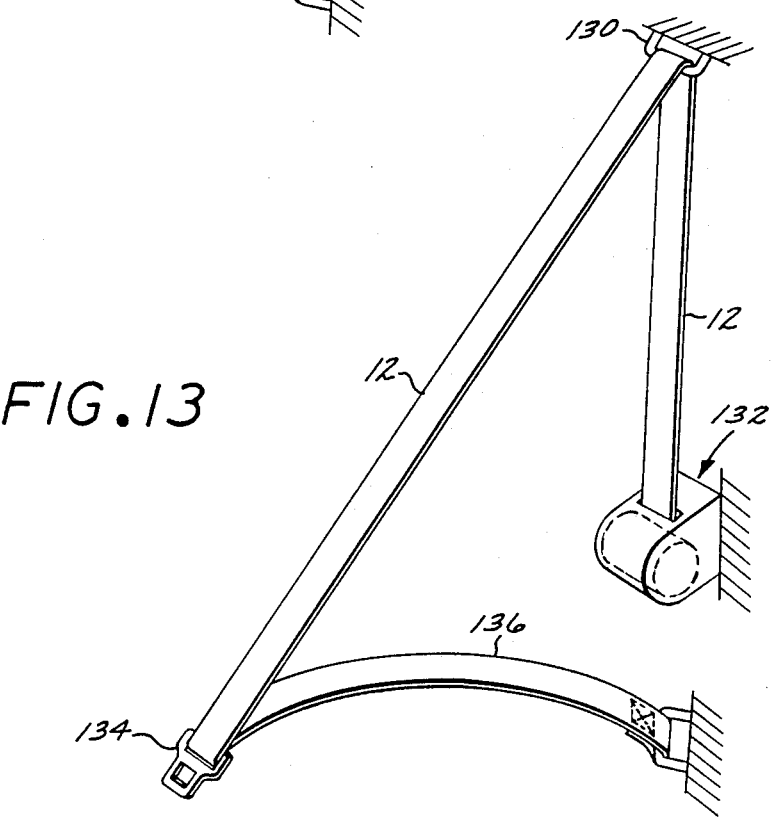
FIG. 13 is a simplified perspective view illustrating a vehicle shoulder belt modified in accordance with a third embodiment of the present invention.

FIG. 13 illustrates a vehicle shoulder belt modified to use the automatic seat belt tightening arrangement discussed with reference to FIG. 10 without air bag deployment system 10. One end of shoulder belt 12 passes through a bracket 130 secured to the interior of the vehicle and is coupled to reel device 132, the other end thereof being coupled to connector buckle 134. A lap belt 136 has one end coupled to buckle 134 in a conventional manner, the other end being connected to the vehicle interior. The speed comparison switch 44 (FIG. 6) is adjusted, in this embodiment, such that shoulder belt 12 is tightened at lower vehicle speeds (i.e., 10 miles per hour) when a collision condition occurs.

The present invention thus provides a compact air bag restraint apparatus which has both automatic and manual modes of operation and which can be incorporated in new or used vehicles in a relatively inexpensive manner. In addition, the automatic mode of operation compensates for faulty shoulder belts, the shoulder belt being automatically tightened when the vehicle's sensor systems detect a collision condition. If the vehicle is moving below the predetermined speed necessary to activate the control circuit 32, the manual air bag deployment system provides a backup safety feature which can be activated in collision situations which would not automatically deploy the air bag. The manual mode of operation can be utilized with the automatic mode of operation or as a separate, independent system.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Safety apparatus for a vehicle having a passenger compartment and a shoulder belt for restraining an occupant of the vehicle comprising:

an inflatable bag mounted on said shoulder belt and movable between a collapsed, inoperative position and an inflated, operative position, for restraining an occupant of the vehicle during a collision;

means for automatically inflating said bag when energized by a sensor signal; said inflating means comprising a motor having a shaft coupled to said shoulder belt, said sensor signal causing said motor shaft to rotate and tighten said shoulder belt against the user's body; and sensor means operatively associated with said vehicle for generating said sensor signal when a collision condition is detected, said bag being inflated a predetermined time period after said motor shaft is caused to rotate.

2. The apparatus of claim 1 wherein said inflating means further comprises a gas containing device which dispenses gas to said bag when a switch member is activated.

3. The apparatus of claim 2 wherein said switch member is activated when said shoulder belt is tightened.

4. The apparatus of claim 1 further including a second shoulder belt for restraining said vehicle occupant and operatively coupled to said inflatable bag.

5. The apparatus of claim 4 wherein said switch member is activated by the movement of said second shoulder belt caused by a collision impact.

6. The apparatus of claim 5 wherein the activation of said switch member by the movement of said second shoulder belt is independent of the vehicle speed.

7. Safety apparatus for a vehicle having a passenger compartment and a shoulder belt for restraining an occupant of the vehicle comprising:
    an inflatable bag mounted on said shoulder belt and movable between a collapsed, inoperative position and an inflated, operative position, for restraining an occupant of the vehicle during a collision; and
    means for inflating said bag associated with said inflatable bag and operable only when a switch member associated therewith is displaced a predetermined distance, said switch member being displaced said distance by the movement of the occupant when said shoulder belt is moved a predetermined distance as a result of the sudden deceleration of the vehicle.

8. The apparatus of claim 7 wherein the inflated bag is shaped to deploy in a manner wherein the front vision of the vehicle driver is not blocked.

9. The apparatus of claim 7 wherein said inflating means comprises a gas containing device which dispenses gas to said bag when a switch member is activated.

10. The apparatus of claim 7 wherein the activation of said switch member by the movement of said shoulder belt is independent of the vehicle speed.

* * * * *